(12) United States Patent
Chiu (10) Patent No.: US 10,249,343 B2
(45) Date of Patent: Apr. 2, 2019

(54) HARD DISK DRIVE HOLDER

(71) Applicants: LITE-ON ELECTRONICS (GUANGZHOU) LIMITED, Guangzhou (CN); Lite-On Technology Corporation, Taipei (TW)

(72) Inventor: Liang-Cheng Chiu, Taipei (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/857,634

(22) Filed: Dec. 29, 2017

(65) Prior Publication Data

US 2018/0233176 A1    Aug. 16, 2018

Related U.S. Application Data

(60) Provisional application No. 62/459,608, filed on Feb. 16, 2017.

(30) Foreign Application Priority Data

Nov. 22, 2017  (CN) .......................... 2017 1 1172009

(51) Int. Cl.
*G06F 1/18*    (2006.01)
*G11B 33/12*   (2006.01)

(52) U.S. Cl.
CPC ............ *G11B 33/124* (2013.01); *G06F 1/187* (2013.01)

(58) Field of Classification Search
CPC ...................................................... G06F 1/187
USPC ..................................................... 361/679.33
See application file for complete search history.

(56) References Cited

U.S. PATENT DOCUMENTS

| | | | | |
|---|---|---|---|---|
| 6,040,979 A | * | 3/2000 | Homer | G06F 1/1616 361/679.37 |
| 7,515,410 B1 | * | 4/2009 | Dingfelder | G06F 1/187 361/679.33 |
| 2008/0316684 A1 | * | 12/2008 | Kilpinen | H01M 2/1066 361/679.01 |
| 2012/0050978 A1 | * | 3/2012 | Lai | G06F 1/187 361/679.33 |

* cited by examiner

*Primary Examiner* — Adrian S Wilson
(74) *Attorney, Agent, or Firm* — JCIPRNET (57) ABSTRACT

A hard disk drive holder includes a bottom plate, a first side plate, and a second side plate. Gaps and a first bending line define a bendable portion and an unbendable portion on the bottom plate. The first side plate has first positioning portions. The second side plate has second positioning portions. The first side plate and the second side plate are respectively and integrally connected to opposite sides of the bottom plate. The first positioning portions and part of the second positioning portions are correspondingly disposed to install a first hard disk drive. The bendable portion has a plurality of third positioning portions, and the third positioning portions and part of the second positioning portions are correspondingly disposed to be adapted for installing at least one second hard disk drive. A size of the second hard disk drive is less than a size of the first hard disk drive.

19 Claims, 8 Drawing Sheets

HARD DISK DRIVE HOLDER

CROSS-REFERENCE TO RELATED APPLICATION

This application claims the priority benefits of U.S. provisional application Ser. No. 62/459,608, filed on Feb. 16, 2017 and China application serial no. 201711172009.0, filed on Nov. 22, 2017. The entirety of each of the above-mentioned patent applications is hereby incorporated by reference herein and made a part of this specification.

BACKGROUND OF THE DISCLOSURE

1. Field of the Disclosure

The disclosure relates to a holder. More particularly, the disclosure relates to a hard disk drive holder.

2. Description of Related Art

A hard disk drive is used to store a variety of types of data in a personal computer, and the hard disk drive is generally installed on the hard disk drive holder in a host of the personal computer. Sizes of the hard disk drives, for example, a 2.5-inch hard disk drive and a 3.5-inch hard disk drive, may vary owning to different specifications. Hard disk drives with various sizes respectively correspond to hard disk drive holders with different sizes. If a user intends to install hard disk drives with different sizes in the host of the personal computer, since an existing hard disk drive holder is not adapted to be used to hold hard disk drives with different sizes, a corresponding hard disk drive holder has to be additionally purchased and installed. Consequently, higher costs as well as more time and effort are required.

SUMMARY OF THE DISCLOSURE

The disclosure provides a hard disk drive holder adapted for being used to hold hard disk drives with various sizes.

In an embodiment of the disclosure, a hard disk drive holder includes a bottom plate, a first side plate, and a second side plate. A plurality of gaps and a first bending line define a bendable portion and an unbendable portion on the bottom plate. The first side plate has a plurality of first positioning portions. The second side plate has a plurality of second positioning portions. The first side plate and the second side plate are respectively and integrally connected to opposite sides of the bottom plate. The first positioning portions and part of the second positioning portions are correspondingly disposed to be adapted for installing a first hard disk drive. The bendable portion has a plurality of third positioning portions, and the third positioning portions and part of the second positioning portions are correspondingly disposed to be adapted for installing at least one second hard disk drive. A size of the at least one second hard disk drive is less than a size of the first hard disk drive.

In an embodiment of the disclosure, a hard disk drive holder includes a bottom plate, a first side plate, and a second side plate. The bottom plate has a bendable portion. The first side plate and the second side plate are respectively and integrally connected to opposite sides of the bottom plate. When the bendable portion is in an unbent state, a first distance is provided between the first side plate and the second side plate to be adapted for accommodating a first hard disk drive. When the bendable portion is in a bent state, a second distance less than the first distance is provided between the bendable portion and the second side plate to be adapted for accommodating at least one second hard disk drive.

To sum up, in the hard disk drive holder provided by the embodiments of the disclosure, the bendable portion can be bent relative to the unbendable portion, such that the form of the hard disk drive holder is changed. To be specific, an initial state of the bendable portion is, for example, an unbent state. In this state, the bendable portion is coplanar with the unbendable portion and does not extend to the space between the first side plate and the second side plate, such that a user can install a hard disk drive with a larger size (e.g., a 3.5-inch hard disk drive) between the first side plate and the second side plate. When the user intends to install a hard disk drive with a smaller size (e.g., a 2.5-in hard disk drive) on the hard disk drive holder, the user may bend the bendable portion relative to the unbendable portion, such that the bendable portion is bent to the space between the first side plate and the second side plate. As such, a smaller installation space is defined between the bendable portion and the second side plate and is provided for installing the hard disk drive with the smaller size. Through such design, the user does not have to additionally purchase and install hard disk drive holders with different sizes to install hard disk drives with different sizes, and thus, costs are saved and simplified installation steps of the hard disk drives are provided.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
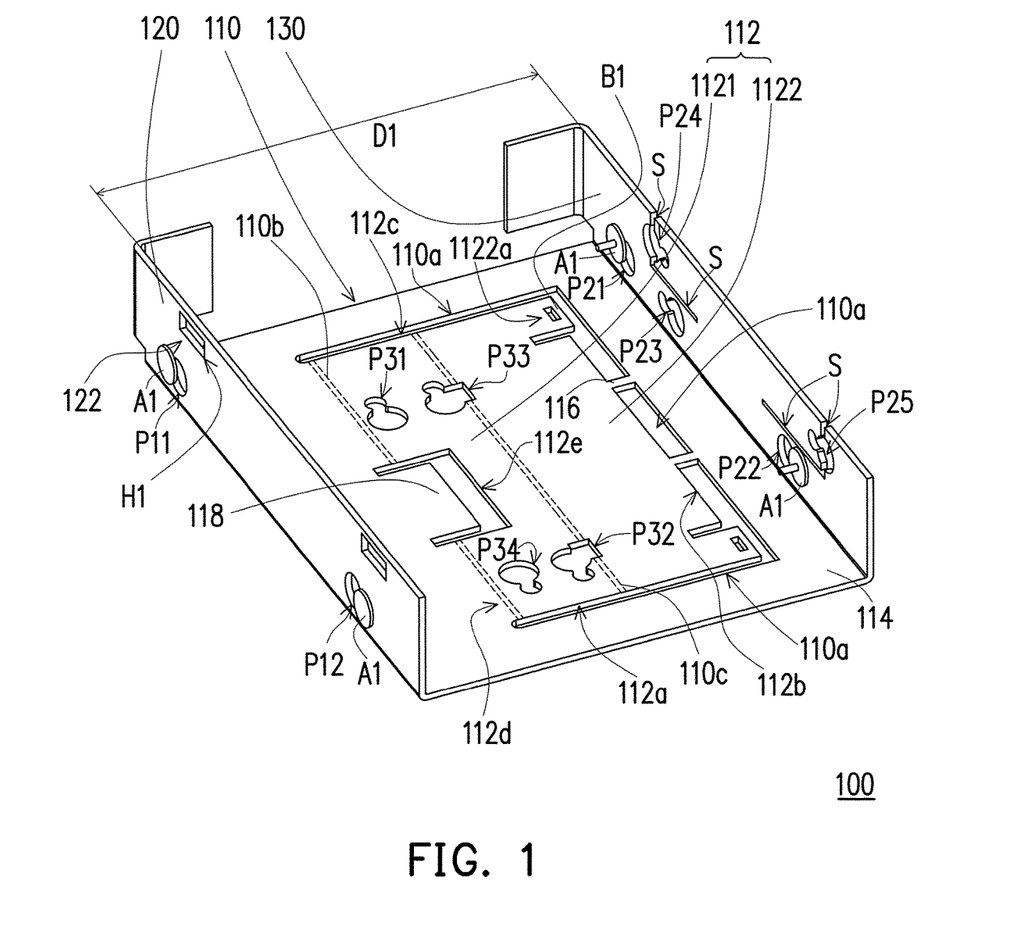
FIG. 1 is a perspective view of a hard disk drive holder according to an embodiment of the disclosure.
Figure 2:
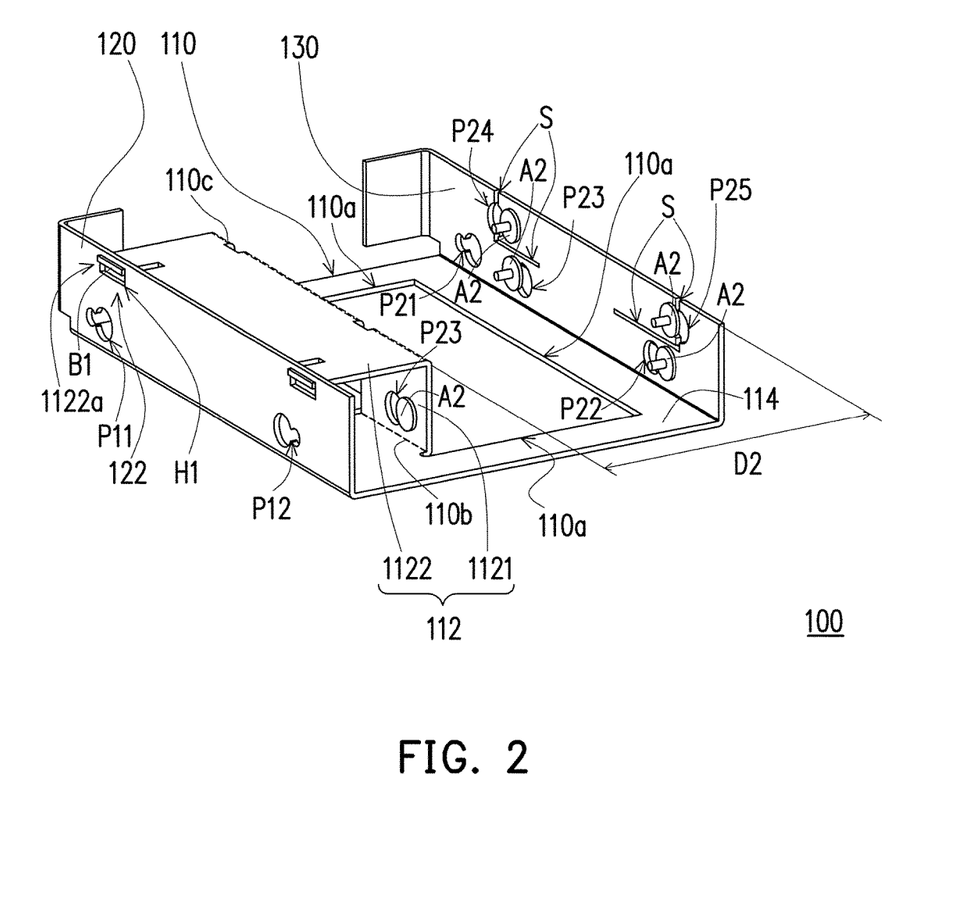
FIG. 2 illustrate a schematic view of a state when a bendable portion of FIG. 1 is bent.

FIG. 1 is a perspective view of a hard disk drive holder according to an embodiment of the disclosure. FIG. 2 illustrate a schematic view of a state when a bendable portion of FIG. 1 is bent. With reference to FIG. 1 and FIG. 2, a hard disk drive holder 100 of this embodiment is, for example, a plastic holder and includes a bottom plate 110, a first side plate 120, and a second side plate 130. A plurality of gaps 110a and a first bending line 110b define a bendable portion 112 and an unbendable portion 114 on the bottom plate 110. The first side plate 120 and the second side plate 130 are respectively and integrally connected to opposite sides of the bottom plate 110. The bendable portion 112 can be bent relative to the bottom plate 110 from an unbent state shown in FIG. 1 to a bent state shown in FIG. 2.

Figure 3:
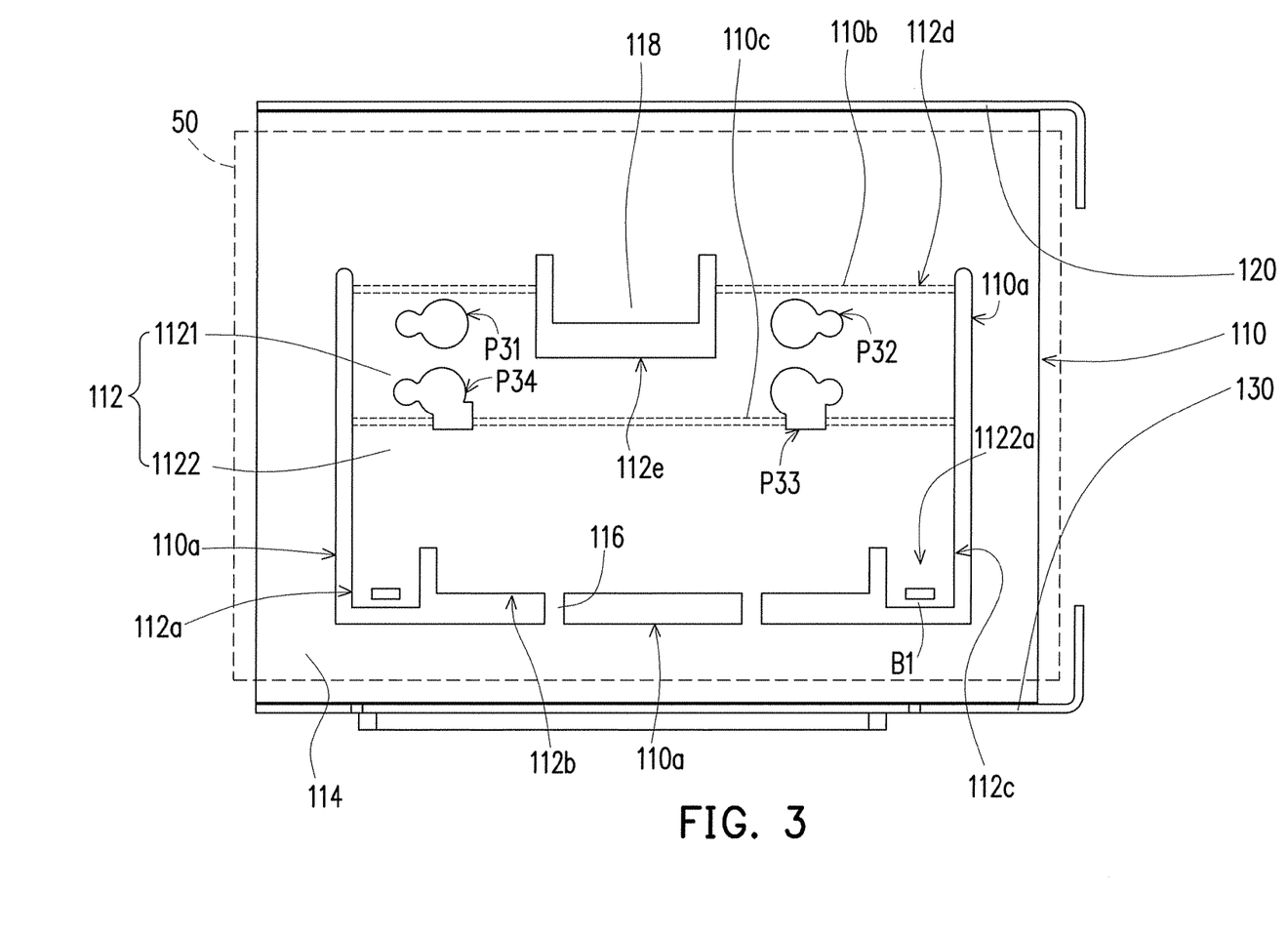
FIG. 3 illustrates the hard disk drive holder of FIG. 1 accommodating a first hard disk drive.
Figure 4:
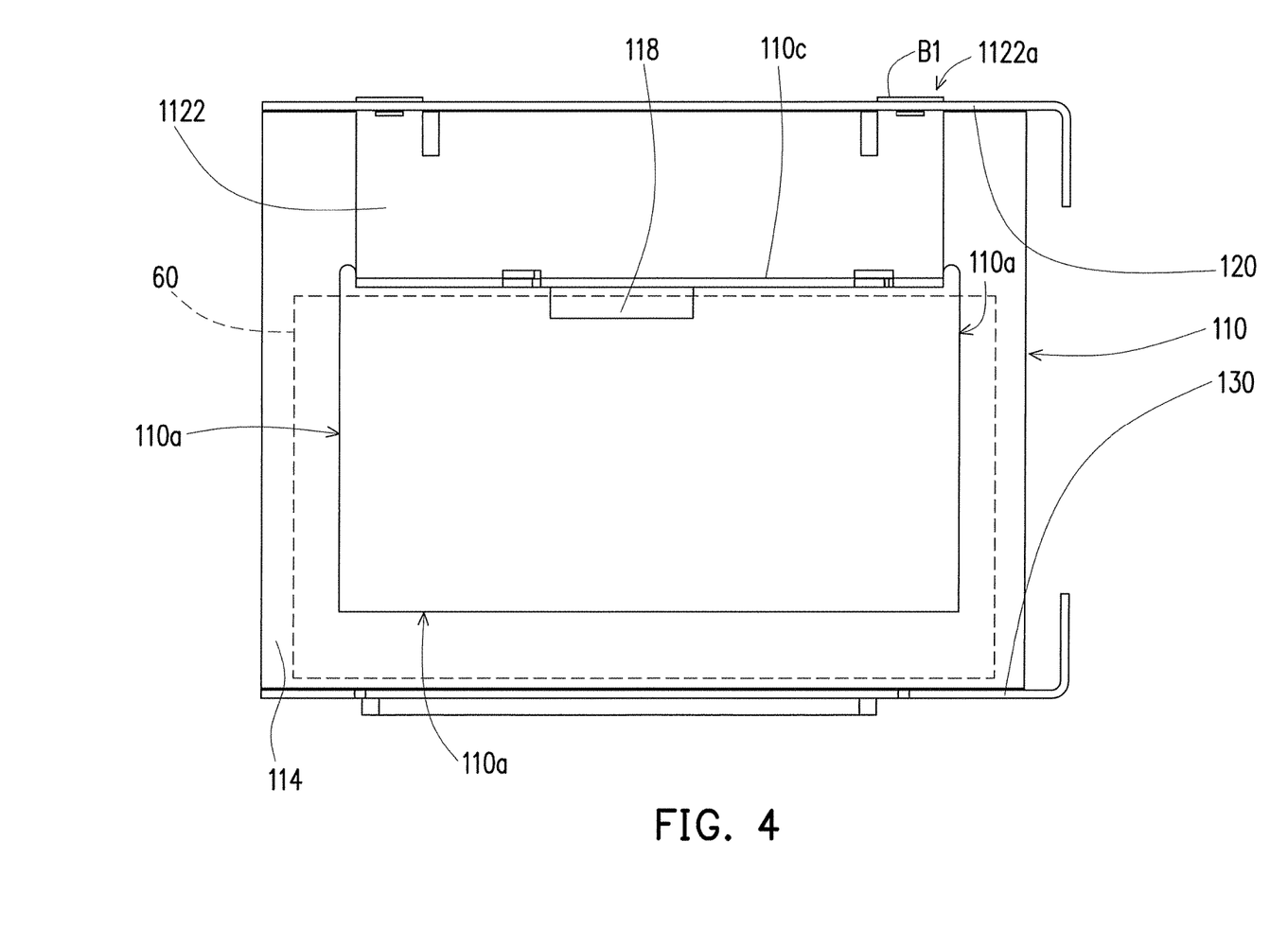
FIG. 4 illustrates the hard disk drive holder of FIG. 2 accommodating a second hard disk drive.

FIG. 3 illustrates the hard disk drive holder of FIG. 1 accommodating a first hard disk drive. FIG. 4 illustrates the hard disk drive holder of FIG. 2 accommodating a second hard disk drive. As shown in FIG. 1, when the bendable portion 112 is in the unbent state, a first distance D1 is provided between the first side plate 120 and the second side plate 130. A space between the first side plate 120 and the second side plate 130 is adapted for accommodating a first hard disk drive 50 (e.g., a 3.5-inch hard disk drive) as shown in FIG. 3. As shown in FIG. 2, when the bendable portion 112 is in the bent state, a second distance D2 less than the first distance D1 is provided between the bendable portion 112 (e.g., a first section 1121 of the bendable portion 112) and the second side plate 130. Moreover, a space between the bendable portion 112 (e.g., the first section 1121 of the bendable portion 112) and the second side plate 130 is adapted for accommodating at least one second hard disk drive 60 (e.g., a 2.5-inch hard disk drive) with a size less than that of the first hard disk drive 50 as shown in FIG. 4.

As described above, the bendable portion 112 can be bent relative to the unbendable portion 114, such that a form of the hard disk drive holder 100 is changed. To be specific, an initial state of the bendable portion 112 is, for example, an unbent state as shown in FIG. 1. In this state, the bendable portion 112 is coplanar with the unbendable portion 114 and does not extend to the space between the first side plate 120 and the second side plate 130. A user can install a hard disk drive with a larger size (e.g., a 3.5-inch hard disk drive) between the first side plate 120 and the second side plate 130. When the user intends to install a hard disk drive with a smaller size (e.g., a 2.5-in hard disk drive) on the hard disk drive holder 100, the user may bend the bendable portion 112 relative to the unbendable portion 114 such that the bendable portion 112 is bent to the space between the first side plate 120 and the second side plate 130 as shown in FIG. 2. As such, an installation space with a smaller size is defined between the bendable portion 112 (e.g., the first section 1121 of the bendable portion 112) and the second side plate 130, and the installation space with the smaller size is provided for installing the hard disk drive with the smaller size. Through such design, the user does not have to additionally purchase and install hard disk drive holders with different sizes so as to install hard disk drives with different sizes, and thus, costs are saved and simplified installation steps of the hard disk drives are provided.

With reference to FIG. 1, the unbendable portion 114 of this embodiment surrounds the bendable portion 112, and the bendable portion 112 has a first side 112a, a second side 112b, a third side 112c, and a fourth side 112d. The first side 112a and the third side 112c are opposite to each other, and the second side 112b and the fourth side 112d are opposite to each other. The gaps 110a are respectively located at the first side 112a, the second side 112b, and the third side 112c. The fourth side 112d is connected to the unbendable portion 114, and the first bending line 110b is located at the fourth side 112d. In other embodiments, the bendable portion 112 and the unbendable portion 114 can be disposed in other suitable manners, which should however not be construed as limitations to the disclosure.

To be specific, the bendable portion 112 of this embodiment includes the first section 1121 and a second section 1122, and the first section 1121 is connected between the second section 1122 and the unbendable portion 114. The bendable portion 112 has a second bending line 110c. The first bending line 110b is located at a juncture between the first section 1121 and the unbendable portion 114, and the second bending line 110c is located at a juncture between the first section 1121 and the second section 1122. The first bending line 110b is parallel to the second bending line 110c. The first section 1121 is adapted to be bent relative to the unbendable portion 114 along the first bending line 110b, and the second section 1122 is adapted to be bent relative to the first section 1121 along the second bending line 110c, such that the second section 1122 is joined to the first side plate 120 as shown in FIG. 2. When the second section 1122 is joined to the first side plate 120, the second distance D2 is provided between the first section 1121 and the second side plate 130, and a space between the first section 1121 and the second side plate 130 is adapted for accommodating the second hard disk drive 60 (shown in FIG. 4).

The bottom plate 110 of this embodiment has least one breakable portion 116 (two are shown) as shown in FIG. 1. The breakable portions 116 are located between the gaps 110a and are connected between the bendable portion 112 and the unbendable portion 114. When the user intends to change the state of the hard disk drive holder 100 shown in FIG. 1 to the state shown in FIG. 2, the user may use tools or other methods, for example, to bend the bendable portion 112 such that the breakable portion 116 is broken off and the bendable portion 112 is bent to the state shown in FIG. 2. In this embodiment, the breakable portion 116 and the first bending line 110b, for example, are respectively located at opposite sides of the bendable portion 112 (e.g., the second side 112b/the fourth side 112d), which should however not be construed as limitations to the disclosure. For instance, in other embodiments, the breakable portion 116 is located at the first side 112a or the third side 112c of the bendable portion 112, and the first bending line 110b is located at the fourth side 112d of the bendable portion 112.

With reference to FIG. 1 and FIG. 2, in this embodiment, the first side plate 120 has at least one first engaging portion 122 (two are shown), and the second section 1122 of the bendable portion 112 has at least one second engaging portion 1122a (two are shown). When the second section 1122 is joined to the first side plate 120 as shown in FIG. 2, the first engaging portions 122 and the second engaging portions 1122a are positioned with each other, such that a bent state of the bendable portion 112 is securely maintained. To be specific, the first engaging portions 122 include openings H1, and the second engaging portions 1122a include protruding portions B1. When the second section 1122 is joined to the first side plate 120 as shown in FIG. 2, the protruding portions B1 are respectively engaged in the openings H1.

The bottom plate 110 of this embodiment has a protruding lug 118 (shown in FIG. 1). The protruding lug 118 extends from the unbendable portion 114 towards the bendable portion 112. The protruding lug 118 is adapted to support the first hard disk drive 50 (shown in FIG. 3) or support the second hard disk 60 (shown in FIG. 4). The first hard disk drive 50 (shown in FIG. 3) is installed on the hard disk drive holder 100 in the state shown in FIG. 1. The second hard disk 60 (shown in FIG. 4) is installed on the hard disk drive holder 100 in the state shown in FIG. 2. In addition, the bendable portion 112 has a space-allowing notch 112e. The space-allowing notch 112e corresponds to the protruding lug 118, so as to prevent a structural interference from occurring between the bendable portion 112 and the protruding lug 118 in the state shown in FIG. 1. In this embodiment, the protruding lug 118 and the space-allowing notch 112e are located at the fourth side 112d of the bendable portion 112, which should however not be construed as limitations to the disclosure.

In this embodiment, one first hard disk drive 50 (shown in FIG. 3) may be installed on the hard disk drive holder 100 in the state shown in FIG. 1, for example. To be specific, the first side plate 120 has two first positioning portions P11 and P12, and the second side plate 130 has a plurality of second positioning portions P21 to P25. The first positioning portions P11 and P12 and the second positioning portions P21 to P25, for example, are shaped as gourd holes. The first positioning portions P11 and P12 are respectively disposed corresponding to the second positioning portions P21 and P22. As such, when the bendable portion 112 is in the unbent state shown in FIG. 1, positioning elements A1 may be further installed to the first positioning portions P11 and P12 and the second positioning portions P21 and P22 such that the first positioning portions P11 and P12 and the second positioning portions P21 and P22 are adapted to respectively position opposite sides of the first hard disk drive 50. The positioning elements A1, for example, include positioning posts and buffer materials (e.g., rubber), so as to provide positioning and buffering functions to the first hard disk drive 50.

In addition, two hard disk drives 60 stacked on each other (shown in FIG. 4) may be installed on the hard disk drive holder 100 in the state shown in FIG. 2, for example. To be specific, the bendable portion 112 has a plurality of third positioning portions P31 to P34. The third positioning portions P31 to P34, for example, are shaped as gourd holes. The third positioning portions P31 to P34 are located at the first section 1121. The third positioning portions P34 and P31 are respectively disposed corresponding to the second positioning portions P22 and P23. The third positioning portions P33 and P32 are respectively disposed corresponding to the second positioning portions P24 and P25. As such, when the bendable portion 112 is in the unbent state shown in FIG. 2, positioning elements A2 may be further installed to the second positioning portions P22 and P23 and the third positioning portions P31 and P34, such that the second positioning portions P22 and P23 and the third positioning portions P31 and P34 are adapted to respectively position opposite sides of one of the second hard disk drives. The positioning elements A2 may be further installed to the second positioning portions P24 and P25 of the second positioning portions and the third positioning portions P33 and P32 of the third positioning portions, such that the second positioning portions P24 and P25 and the third positioning portions P33 and P32 are adapted to position opposite sides of the other one of the second hard disk drives. The positioning elements A2, for example, include positioning posts and buffer materials (e.g., rubber), so as to provide positioning and buffering functions to the second hard disk drives 60. As described above, the second positioning portion P22 can be configured to position the first hard disk drive 50 in the state shown in FIG. 1 and can also be further configured to position the second hard disk drives 60 in the state shown in FIG. 2.

Further, the second side plate 130 of this embodiment has a plurality of opening slots S. A section is surrounded by the opening slots S and the second positioning portions P24 and P25 at the second side plate 130. Less effort from the user is required to pull out the section, such that the second hard disk drives 60 may be installed to the hard disk drive holder 100 with ease.

Figure 5:
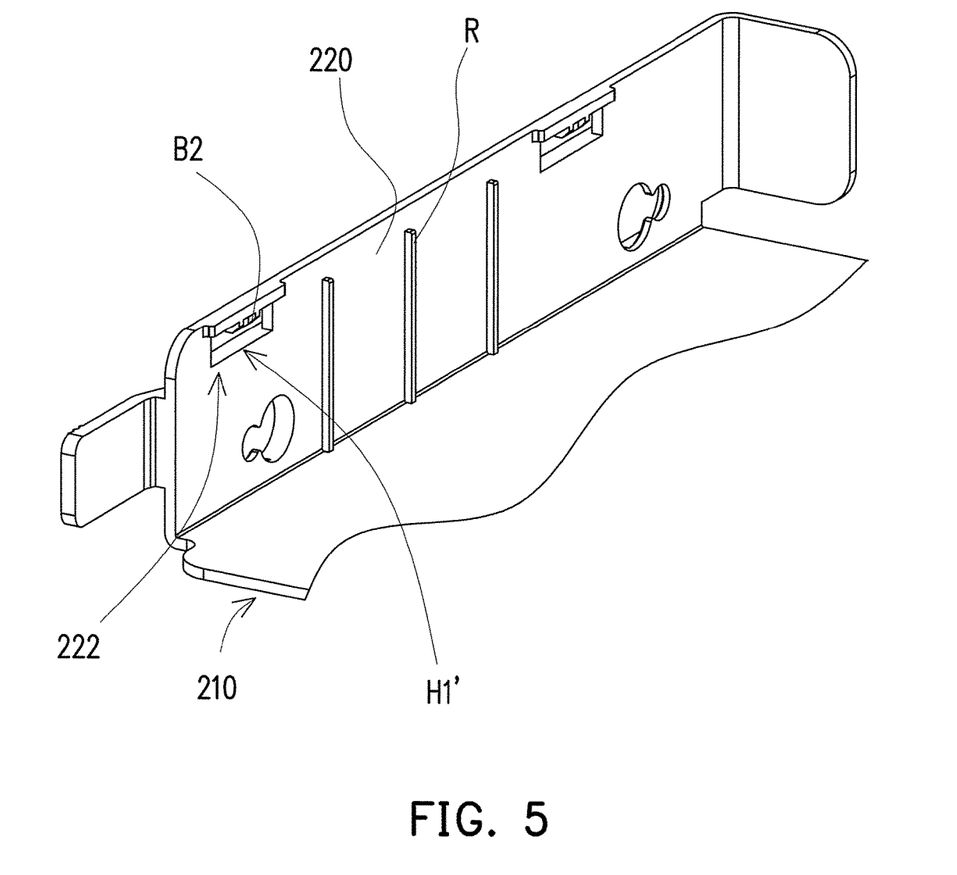
FIG. 5 and FIG. 6 are local perspective views of a hard disk drive holder according to another embodiment of the disclosure.
Figure 6:
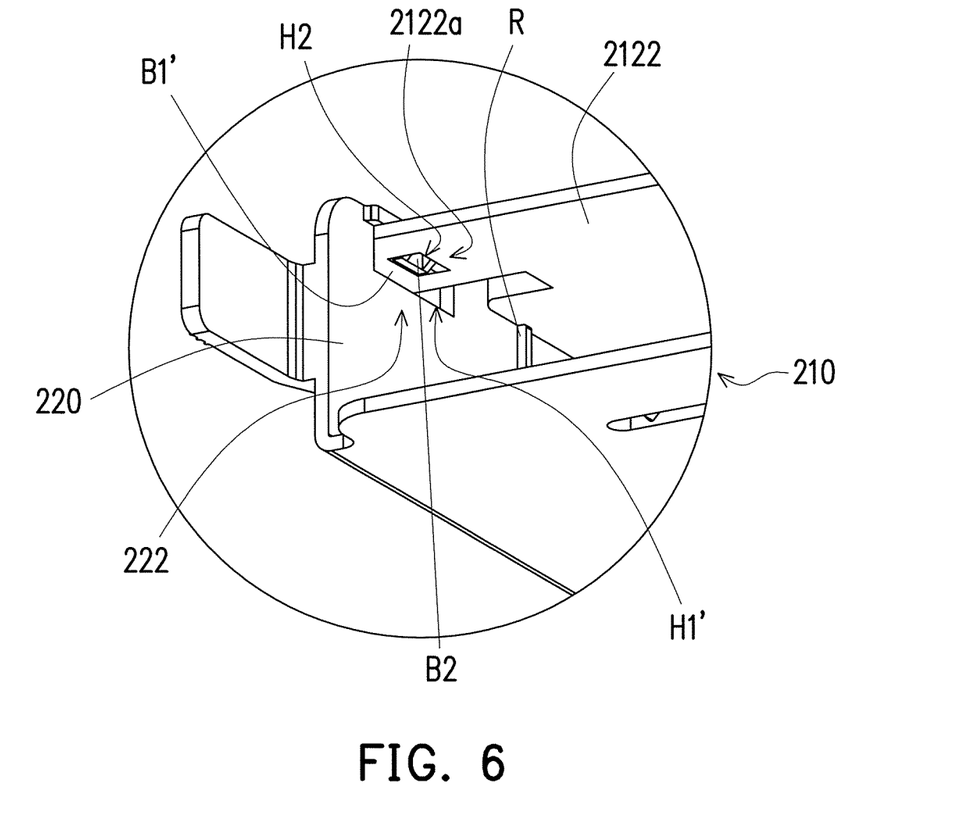

FIG. 5 and FIG. 6 are local perspective views of a hard disk drive holder according to another embodiment of the disclosure. In the embodiment of FIG. 5 and FIG. 6, a bottom plate 210, a first side plate 220, a first engaging portion 222, a second section 2122, a second engaging portion 2122a, an opening H1', a protruding portion B1' are disposed and operated in a manner similar to how the bottom plate 110, the first side plate 120, the first engaging portion 122, the second section 1122, the second engaging portion 1122a, the opening H1, the protruding portion B1 of the embodiment of FIG. 1 and FIG. 2 are disposed and operated. Thus, details are not repeated hereinafter. A difference between the embodiment illustrated in FIG. 5 and FIG. 6 and the embodiment illustrated in FIG. 1 and FIG. 2 includes that the first engaging portion 222 further includes a protruding portion B2 and the second engaging portion 2122a further includes an opening H2. When the second section 2122 is joined to the first side plate 220 as shown in FIG. 6, the protruding portion B1' is engaged in the opening H1' and the protruding portion B2 is engaged in the opening H2. Besides, the first side plate 220 has at least one protruding rib R (three are shown in FIG. 5). When the second section 2122 is joined to the first side plate 220 as shown in FIG. 6, the at least one protruding rib R supports the second section 2122.

Figure 7:
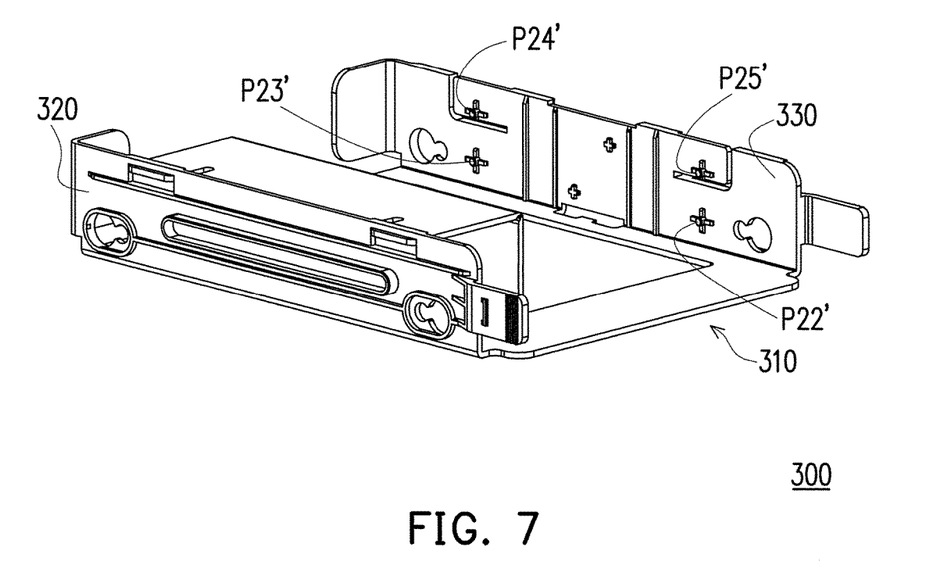
FIG. 7 and FIG. 8 are schematic views of a bendable portion of a hard disk drive holder after being bent according to another embodiment of the disclosure.
Figure 8:
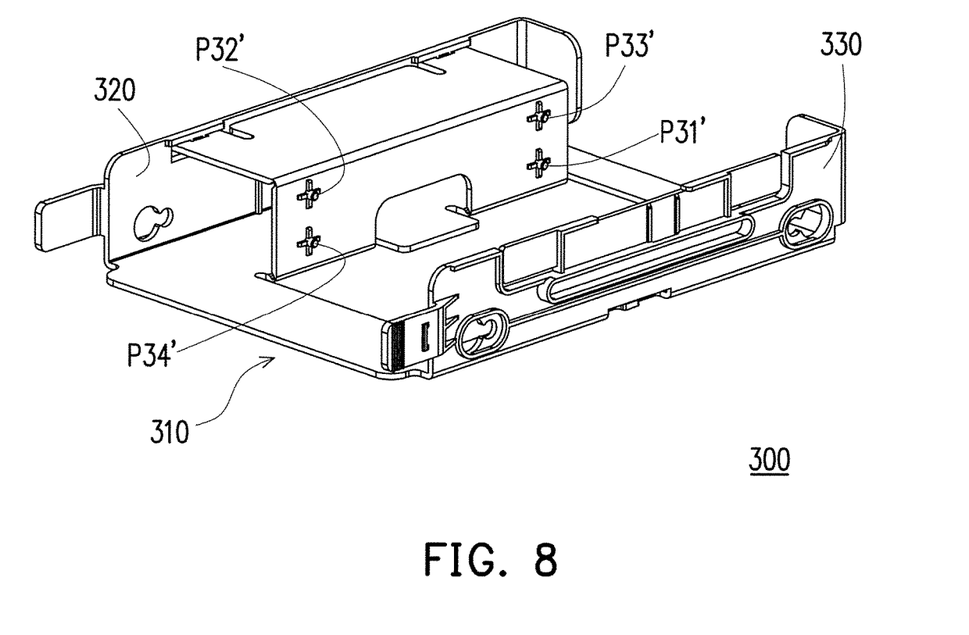

FIG. 7 and FIG. 8 are schematic views of a bendable portion of a hard disk drive holder after being bent according to another embodiment of the disclosure. In the embodiment of FIG. 7 and FIG. 8, a hard disk drive holder 300 includes a bottom plate 310, a first side plate 320, and a second side plate 330. The bottom plate 310, the first side plate 320, the second side plate 330 are disposed and operated in a manner similar to how the bottom plate 110, the first side plate 120, and the second side plate 130 of FIG. 1 and FIG. 2 are disposed and operated. Thus, details are not repeated hereinafter. A difference between the embodiment illustrated in FIG. 7 and FIG. 8 and the embodiment illustrated in FIG. 1 and FIG. 2 includes that second positioning portions P22' to P25' and third positioning portions P31' to P34' are not shaped as gourd holes as the second positioning portions P22 to P25 and the third positioning portions P31 to P34. The second positioning portions P22' to P25' are bosses that are integrally connected to the second side plate 330 and that can directly position one side of the hard disk drive. The third positioning portions P31' to P34' are bosses that are integrally connected to the bottom plate 310 and that can directly position the other side of the hard disk drive. The hard disk drive holder 300 may thus be used more conveniently.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:
1. A hard disk drive holder, comprising:
 a bottom plate, wherein a plurality of gaps and a first bending line define a bendable portion and an unbendable portion on the bottom plate;

a first side plate, having a plurality of first positioning portions; and a second side plate, having a plurality of second positioning portions, wherein the first side plate and the second side plate are respectively and integrally connected to opposite sides of the bottom plate, and the first positioning portions and part of the second positioning portions are correspondingly disposed to be adapted to install a first hard disk drive, wherein the bendable portion has a plurality of third positioning portions, the third positioning portions and part of the second positioning portions are correspondingly disposed to be adapted to install at least one second hard disk drive, and a size of the at least one second hard disk drive is less than a size of the first hard disk drive.

2. The hard disk drive holder as claimed in claim 1, wherein the bendable portion has a first side, a second side, a third side, and a fourth side, the first side and the third side are opposite to each other, the second side and the fourth side are opposite to each other, the gaps are respectively located at the first side, the second side, and the third side, and the fourth side is connected to the unbendable portion.

3. The hard disk drive holder as claimed in claim 1, wherein at least one breakable portion is provided between the gaps, and the at least one breakable portion is connected between the bendable portion and the unbendable portion.

4. The hard disk drive holder as claimed in claim 3, wherein the at least one breakable portion and the first bending line are respectively located at opposite sides of the bendable portion.

5. The hard disk drive holder as claimed in claim 1, wherein a protruding lug extends from the unbendable portion towards the bendable portion, the bendable portion has a space-allowing notch, and the space-allowing notch corresponds to the protruding lug.

6. The hard disk drive holder as claimed in claim 1, wherein the bendable portion comprises a first section and a second section, the first section is connected between the second section and the unbendable portion, the third positioning portions are located at the first section, the first section is adapted to be bent relative to the unbendable portion and the second section is adapted to be bent relative to the first section such that the second section is joined to the first side plate.

7. The hard disk drive holder as claimed in claim 6, wherein the bendable portion has a second bending line, the first bending line is located at a juncture between the first section and the unbendable portion, the second bending line is located at a juncture between the first section and the second section, and the first bending line is parallel to the second bending line.

8. The hard disk drive holder as claimed in claim 6, wherein the first side plate has at least one first engaging portion, the second section has at least one second engaging portion, and the at least one second engaging portion and the at least one first engaging portion are adapted to be positioned with each other such that the second section is joined to the first side plate.

9. The hard disk drive holder as claimed in claim 8, wherein one of the at least one first engaging portion and the at least one second engaging portion comprises an opening, the other one of the at least one first engaging portion and the at least one second engaging portion comprises a protruding portion, and the protruding portion is configured to be engaged in the opening.

10. A hard disk drive holder, comprising:

a bottom plate, wherein a plurality of gaps and a first bending line defines a bendable portion and an unbendable portion on the bottom plate;

a first side plate; and a second side plate, wherein the first side plate and the second side plate are respectively and integrally connected to opposite sides of the bottom plate, a first distance is provided between the first side plate and the second side plate to be adapted for accommodating a first hard disk drive when the bendable portion is in an unbent state, and a second distance less than the first distance is provided between the bendable portion and the second side plate to be adapted for accommodating at least one second hard disk drive when the bendable portion is in a bent state.

11. The hard disk drive holder as claimed in claim 10, wherein the bendable portion has a first side, a second side, a third side, and a fourth side, the first side and the third side are opposite to each other, the second side and the fourth side are opposite to each other, the gaps are respectively located at the first side, the second side, and the third side, and the fourth side is connected to the unbendable portion.

12. The hard disk drive holder as claimed in claim 10, wherein at least one breakable portion is provided between the gaps, and the at least one breakable portion is connected between the bendable portion and the unbendable portion.

13. The hard disk drive holder as claimed in claim 12, wherein the at least one breakable portion and the first bending line are respectively located at opposite sides of the bendable portion.

14. The hard disk drive holder as claimed in claim 10, wherein a protruding lug extends from the unbendable portion towards the bendable portion, the bendable portion has a space-allowing notch, and the space-allowing notch corresponds to the protruding lug.

15. The hard disk drive holder as claimed in claim 10, wherein the bendable portion comprises a first section and a second section, the first section is connected between the second section and the unbendable portion, the first section is adapted to be bent relative to the unbendable portion and the second section is adapted to be bent relative to the first section such that the second section is joined to the first side plate.

16. The hard disk drive holder as claimed in claim 15, wherein the bendable portion has a second bending line, the first bending line is located at a juncture between the first section and the unbendable portion, the second bending line is located at a juncture between the first section and the second section, and the first bending line is parallel to the second bending line.

17. The hard disk drive holder as claimed in claim 15, wherein the first side plate has at least one first engaging portion, the second section has at least one second engaging portion, and the at least one second engaging portion and the at least one first engaging portion are adapted to be positioned with each other such that the second section is joined to the first side plate.

18. The hard disk drive holder as claimed in claim 17, wherein one of the at least one first engaging portion and the at least one second engaging portion comprises an opening, the other one of the at least one first engaging portion and the at least one second engaging portion comprises a protruding portion, and the protruding portion is configured to be engaged in the opening.

19. A hard disk drive holder, comprising:
a bottom plate, having a bendable portion;
a first side plate, having a plurality of first positioning portions; and
a second side plate, having a plurality of second positioning portions, wherein the first side plate and the second side plate are respectively and integrally connected to opposite sides of a bottom plate, the bendable portion has a plurality of third positioning portions, the first positioning portions and part of the second positioning portions are adapted to respectively position two opposite sides of a first hard disk drive when the bendable portion is in an unbent state, and part of the second positioning portions and the third positioning portions are adapted to respectively position two opposite sides of at least one second hard disk drive when the bendable portion is in a bent state.

* * * * *